UNITED STATES PATENT OFFICE.

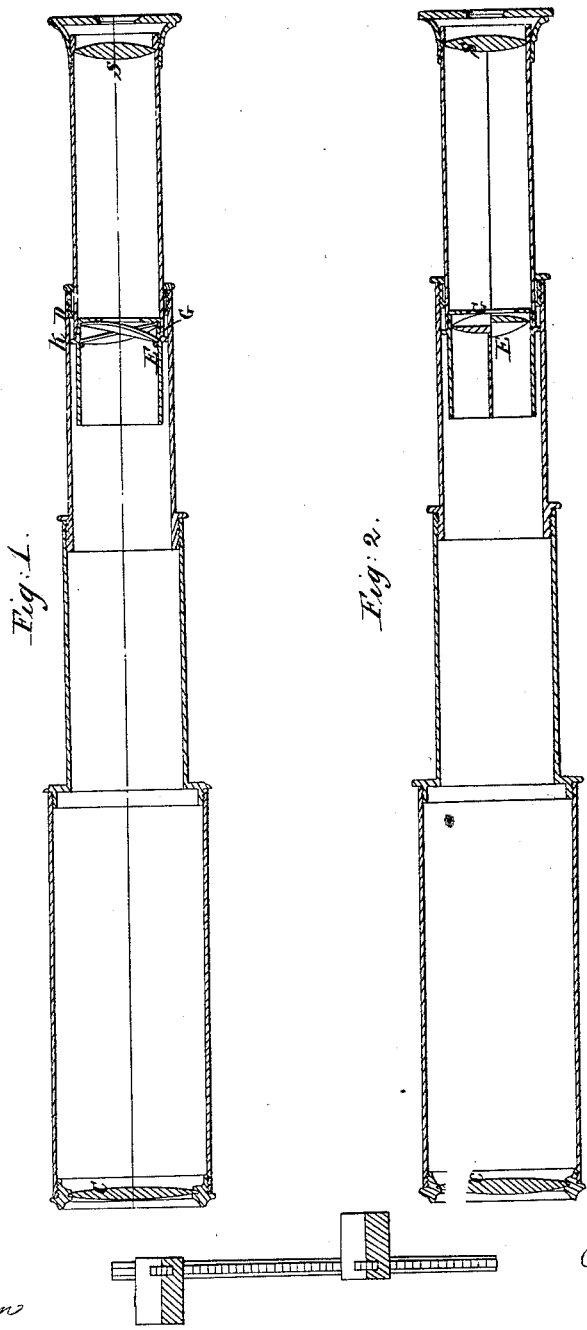

BRUTUS DE VILLEROI, OF PHILADELPHIA, PENNSYLVANIA.

INSTRUMENT FOR ASCERTAINING THE DISTANCE BETWEEN ITSELF AND THE TARGET WITHOUT CHAINING.

Specification of Letters Patent No. 23,294, dated March 22, 1859.

*To all whom it may concern:*

Be it known that I, BRUTUS DE VILLEROI, of the city and county of Philadelphia, State of Pennsylvania, have invented a new surveying instrument intended to give the distances between the stations by means of a single observation through the instrument without the necessity of using a chain or any other measuring apparatus; and I do hereby declare that the following is a full and exact description.

It consists of an ordinary telescope, such as is used in the common level, but having attached to its eye-tube an appendage which I proceed to describe with its construction and operation.

To the inner end of the eye-tube is screwed another tube of equal diameter, and divided throughout its whole length by a vertical partition or diaphragm. At the extremity of this tube, next the eye-piece, is placed a ring, containing a bisected lens, D, E, G, K, the two halves of which are equally inclined on opposite sides of the vertical plane, penpendicular to the axis of the telescope. The eye-tube is itself divided by a vertical diaphragm, which abuts against the semi-lenses, and is prolonged very nearly to the eye-piece S. In adjusting the instrument these two diaphragms must coincide accurately in the same plane, which is easily arranged by tightening or loosening the screw which connects the two tubes. The accompanying figure will make this arrangement easily understood.

The target staff (Figure 2) carries two targets projecting on opposite sides of the staff, and at right angles to it. The lower half of each target is colored black, the upper half white. The upper target is stationary, and from its center line a graduated scale proceeds downward along the staff as far as is necessary. The lower target slides upon the staff and carriers an index opposite to its center line, which indicates the degree of graduation to which its position corresponds.

To understand the operation of this instrument let us suppose the target staff erected at any distance, and the telescope adjusted to the eye of the observer. Let us consider, first, the upper target. The rays from this, which fall upon the object glass C (Fig. 1) will form an image of the target in the instrument, from which image the rays will strike upon the two inclined lenses, which will form two images, one above and one below the axis, unless, however, the inclination of the lenses to the vertical plane perpendicular to the axis be very small, these two images will be too far apart to be both in the field of the instrument at the same time. Let us suppose that the lower image is alone visible. Now the lower target will also produce two images of itself, of which the upper one will be in the field of the instrument, and it is very evident that by sliding it up or down on the staff causing it to approach to, or recede from, the upper target, we can find a position in which the images of the two targets coincide, and their central lines then appear as one horizontal line crossing the staff. The mathematical theory of the refraction of light through lenses shows that, when this is the case, the distance between the lines will be very nearly proportional to the distance of the target from the instrument, and the error made by assuming this proportion as strictly true is exceedingly small in any case, and diminishes as the distance increases, and at reasonable distances will be within the probable error of observation. If, therefore, any instrument of this kind be placed at one extremity of a carefully measured line, and the distance between the targets at the other extremity be ascertained when the images of the center lines coincide, this distance, divided into equal parts, will furnish the graduated scale necessary for the instrument.

The accuracy of the work performed by this instrument will depend, as well upon the care of determining the exact point at which the two lines coincide, as upon the precision with which the reading of the scale is effected. The rodman will, therefore, have a greater responsibility thrown upon him than at present, from which, however, the surveyor may relieve him by inspecting the staff himself previous to its removal from its station. Neither observation, however, is difficult, and no practical difficulty will be found to arise from them.

The greater rapidity with which work can be done by this instrument presents a very great advantage, and under certain circumstances, such as surveying in rocky, bushy, or swampy grounds, it is very valuable. It also allows the easy determination of distances in places where direct measurement is impossible, such as across broad sheets of water.

What I claim as my invention and desire to secure by Letters Patent, is—

The addition, by means of a screw, of a tube containing the lens and is divided throughout its whole length by a vertical partition or diaphragm. At the extremity of this tube next the eye-piece, is placed a ring containing a bisected lens D, E, G, K, the two halves of which are equally inclined on opposite sides of the vertical plane, perpendicular to the axis of the telescope.

DE VILLEROI.

Signed in presence of us witnesses:
GIRARD, JNE.,
GEO. PATCHEL.